March 10, 1925. 1,529,324

H. L. STEEB ET AL

MOLDING MACHINE

Filed Feb. 26, 1921 5 Sheets-Sheet 3

Inventors
Harry L Steeb and
Ezra H Lohner
By: Wm O Belt atty.

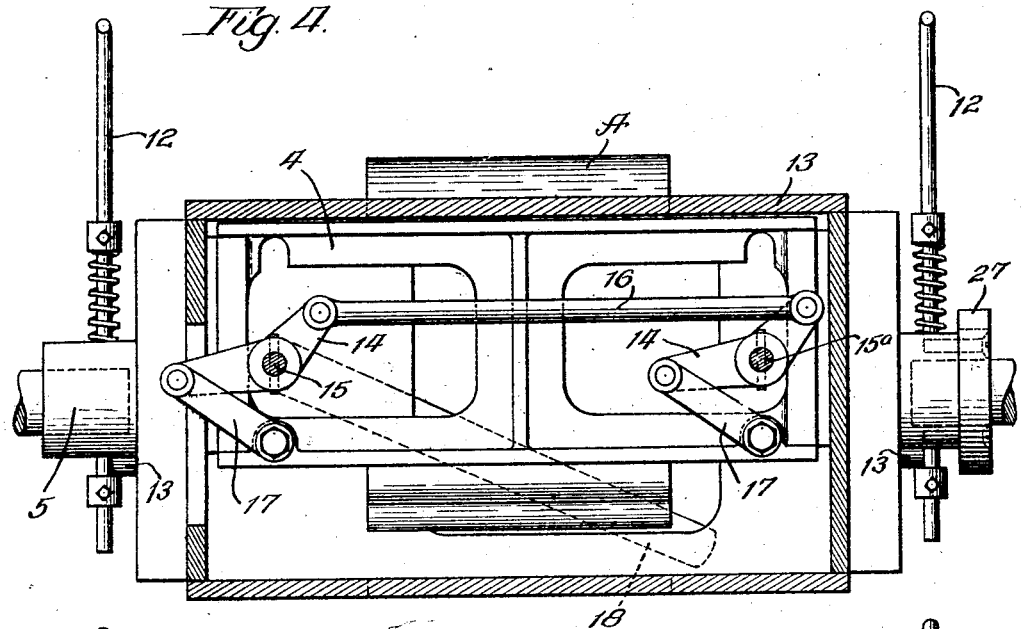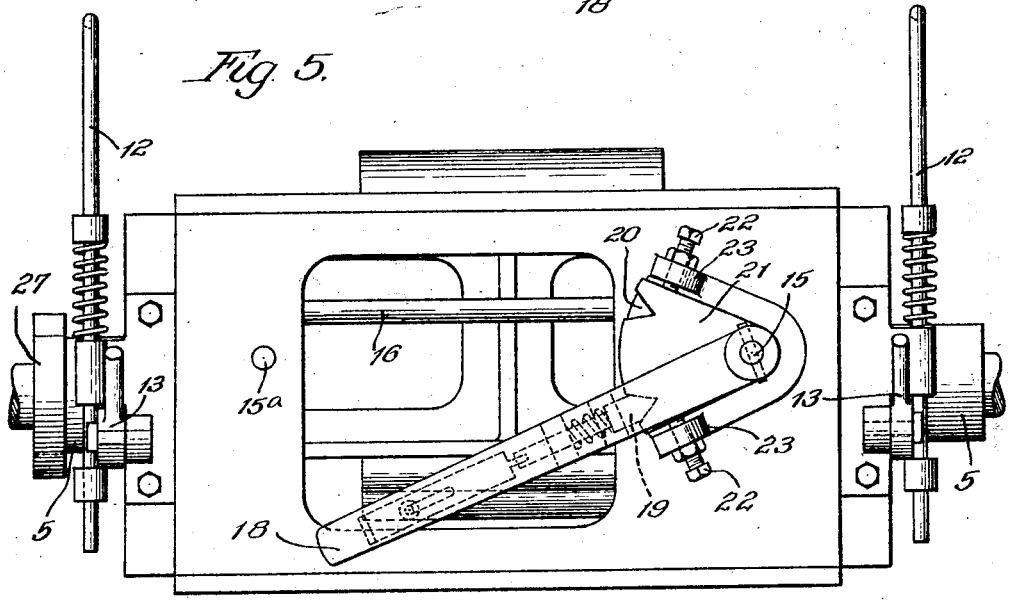

March 10, 1925.  
H. L. STEEB ET AL  
MOLDING MACHINE  
Filed Feb. 26, 1921

Inventors  
Harry L. Steeb and  
Ezra H. Sohner  
By Wm O Bell atty.

Patented Mar. 10, 1925.

1,529,324

UNITED STATES PATENT OFFICE.

HARRY L. STEEB AND EZRA H. SOHNER, OF MOLINE, ILLINOIS.

MOLDING MACHINE.

Application filed February 26, 1921. Serial No. 447,959.

*To all whom it may concern:*

Be it known that we, HARRY L. STEEB and EZRA H. SOHNER, citizens of the United States, residing at Moline, in the county of Rock Island and State of Illinois, have invented certain new and useful Improvements in Molding Machines, of which the following is a specification.

Our invention relates to founding practice and comprises mechanism for use in preparing molds.

The main object of our invention is to facilitate the handling of patterns and flasks in preparing the mold for the casting operation.

In attaining this general object it is desired to eliminate delays in assembling the patterns with the flask members, to provide mechanism for reversing the flask drag or cope and its pattern after the sand in the flask element has been rammed; to provide means for stripping the pattern element from its mold; and to provide for removal of a flask member and its mold from a machine without injury to the mold.

Further objects of our invention are to provide adjustable elements for accurately controlling the reversing of the flask member, stripping of mold and pattern, and to provide locking means for preventing accidental operation of the mechanisms.

We also desire to mount the flask parts and patterns so that in preparing a number of molds for one article the cooperating molds will be equal in number, will align when assembled, and be uniform at the parting line.

Other more specific objects of our invention are mentioned in the specification in connection with the description of details of the construction which are adapted to secure those objects.

In the accompanying drawings which illustrate a selected embodiment of our invention—

Fig. 4 is a vertical transverse section on line 4—4 of Fig. 2.

Fig. 5 is a view of the revolving frame taken on line 5—5 of Fig. 2.

Figure 1:
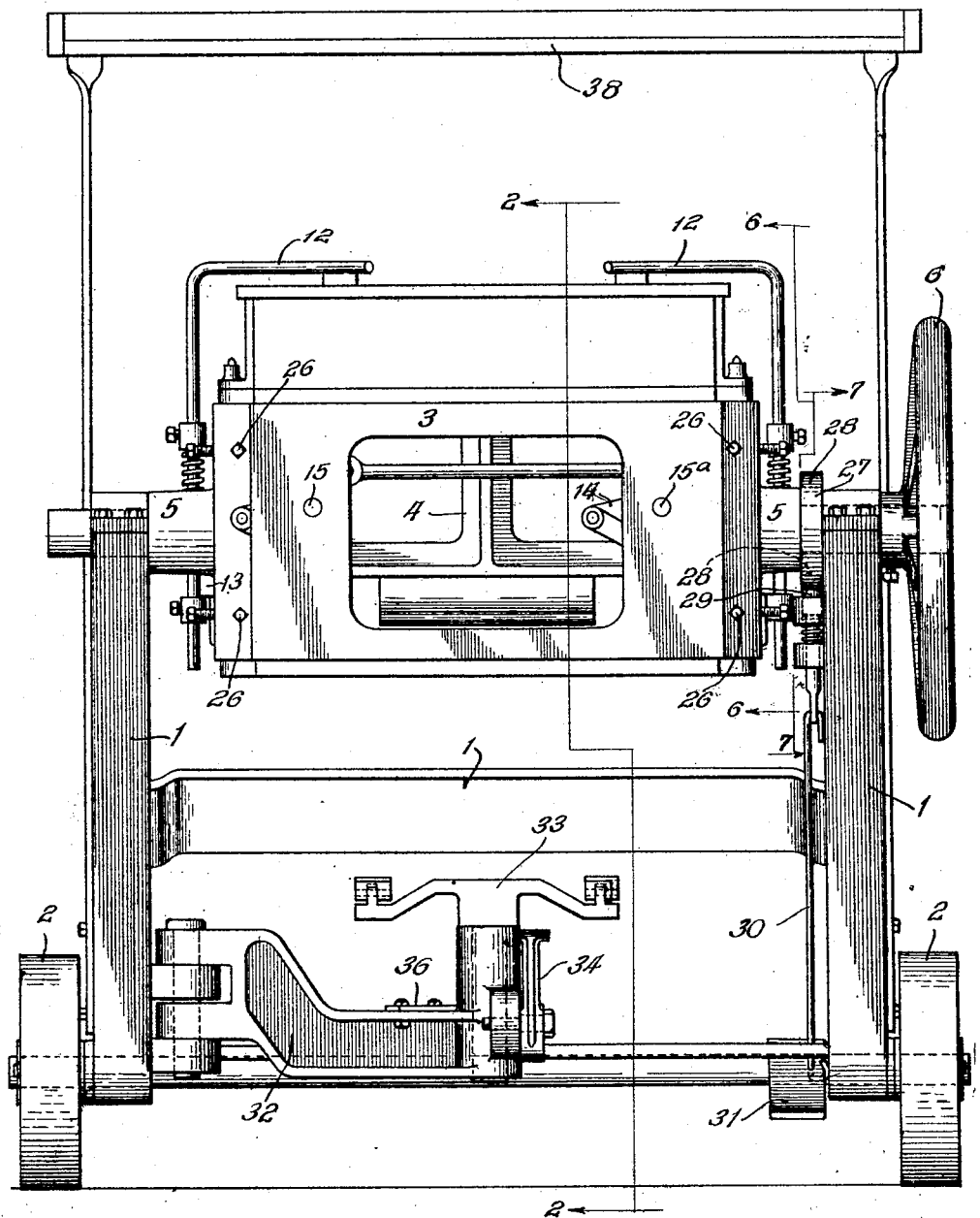
Fig. 1 is a front elevation of our machine.
Figure 6:
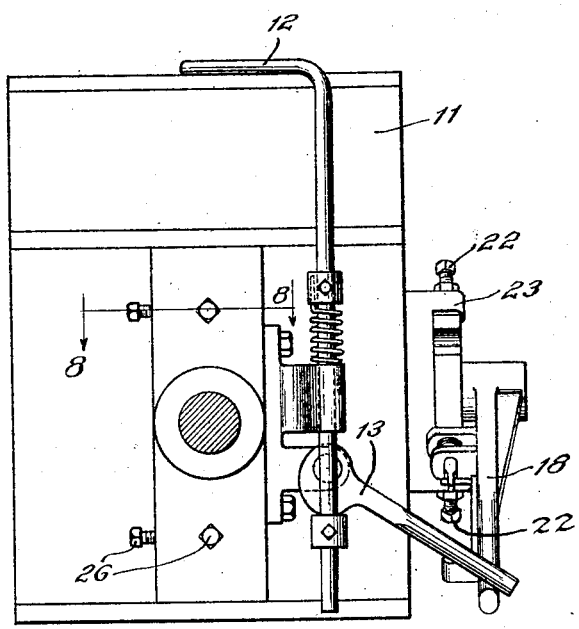
Figure 7:
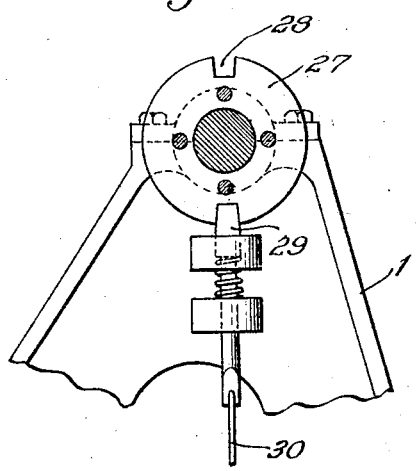

Figs. 6 and 7 are detailed views taken on line 6—6 and 7—7 of Fig. 1.

Figure 8:
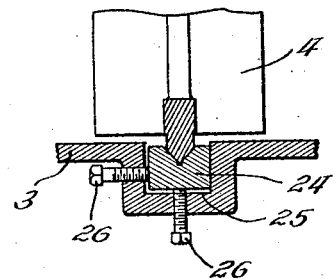

Fig. 8 is a horizontal section of the pattern support guide taken on line 8—8 of Fig. 6.

The machine carriage 1 is mounted on wheels 2 whereby it may be moved to any convenient location and the carriage mounts the mechanisms which hold the flask and pattern and which are adapted to reverse same, which strip the pattern from its mold and which deliver the flask after the mold is completed.

The flask and pattern holding mechanism comprises a flask support frame 3 and a pattern support base 4. The frame 3 is rotatably mounted on carriage 1 by means of trunnions 5 journaled in the carriage and provided with a hand wheel 6.

Frame 3 is in the form of a hollow box, and pattern base 4 is mounted therein so as to be movable vertically in the frame. The top and bottom of frame 3 consist of removable stripping plates 7 and 8 which may be changed for different patterns and which are provided with openings 9 and 10, respectively, adapted to receive, and preferably, to fit around a portion of their respective pattern elements, and permit that portion of the pattern which is to be molded to project through the plate into a flask member. When base 4 is moved across frame 3 to alternately project one pattern element through its frame plate, it simultaneously withdraws the other pattern element through its frame plate.

Figure 2:
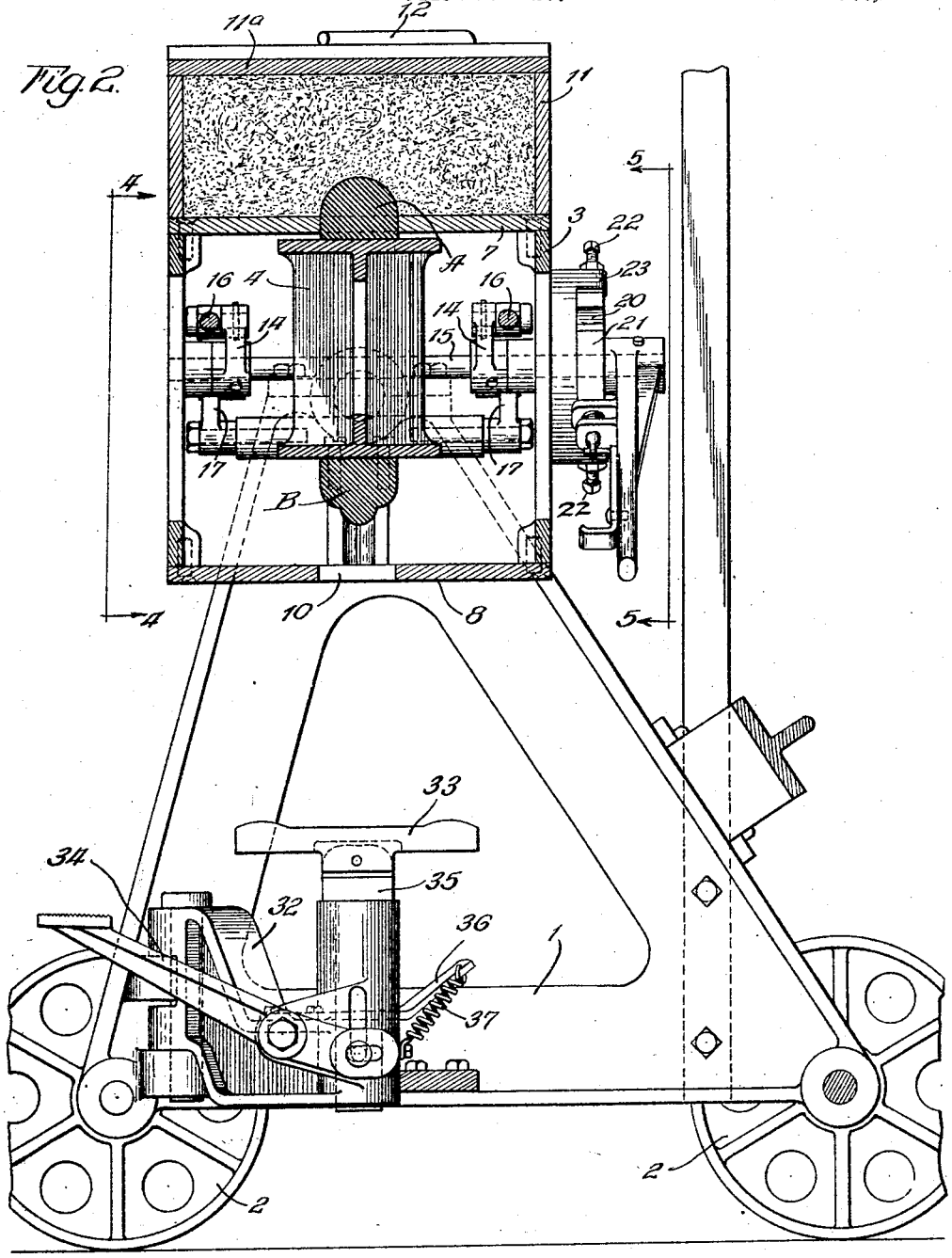
Fig. 2 is a vertical longitudinal section on line 2—2 of Fig. 1 showing one flask member in the position in which its section of the mold is formed and with that section completed.

Each plate 7 and 8 is adapted to have a flask member secured thereto and Figs. 1, 2 and 6 illustrate a flask member 11, which we shall term the drag, provided with the cover 11ª and secured against plate 7 by means of hooks 12 slidably mounted upon frame 3, and held in flask securing position by cam clamps 13.

The pattern base shifting mechanism, as best illustrated in Figs. 4 and 5, comprises a pair of spaced bell cranks 14 mounted on each of shafts 15 and 15ª. These shafts extend through openings in base 4, are spaced transversely of the flask supporting frame 3 and journaled therein. One arm of each bell crank on one shaft is pivotally connected to the corresponding arm of the opposite bell crank on the other shaft by respective rods 16 which provide simultaneous action of the bell cranks and their shafts. The other arms of the bell cranks are pivotally connected to pattern base 4 by means of individual links 17.

Bell cranks 14 are shifted by means of a lever 18 mounted on shaft 15 outside of the frame wall and which is provided with a retractable pawl 19 which engages notches 20 in an adjustable block 21 pivoted on shaft 15 and held in adjusted position by screws 22 in lugs 23 which project from the frame wall.

It is obvious that when the bell crank shafts are turned, the pattern supporting base will be moved alternately to and from the respective stripping plates 7 and 8.

Base 4 must shift in a direction at right angles to plates 7 and 8 in order to prevent injury to the mold when the pattern element is withdrawn and to insure such movement against variations due to flexibility in the mechanism, I provide base 4 with adjustable guides 24 (Fig. 8) mounted in recesses 25 in frame 3 and secured therein by means of screws 26.

One of the trunnions 5 on frame 3 has a relatively fixed collar 27 provided with diametrically opposite notches 28 adapted to receive a plunger 29 slidably mounted upon carriage 1 and which may be retracted by a rod 30 connected to a treadle 31. Plunger 29 and collar 27 secure frame 3 against undesired rotation on the carriage.

To remove a flask member from frame 3, we provide the carriage with a hinged arm 32 which carries a pedestal 33 at its swinging end adapted to be raised and lowered on arm 32 by means of a lever 34 which is fulcrumed on arm 32 and has a pin and slot connection to the column 35 of pedestal 33.

Arm 32 carries a bracket 36, the outer end of which is located above the lowermost position of the adjacent end of lever 34 and substantially opposite the uppermost position of the latter. A tension spring 37 connects this end of bracket 36 with the adjacent end of lever 34 and, as the extreme positions of the lever end are more remote from the bracket end than its intermediate positions, the spring yieldingly resists movement of the lever from a central position to either of its extreme positions shown respectively in Figs. 2 and 3.

The function of arm 32 and pedestal 33 is to receive a flask member, lower it from its frame plate and swing it out from the machine carriage so that it may be picked up and set where desired. Bracket 36 and spring 37 are designed to reduce the shock produced by terminal movement of pedestal 33 towards the flask member or towards arm 32.

We prefer to provide our machine with an elevated table 38 to accommodate the molder's tools and other equipment but this is optional and forms no part of our invention.

Operation: In the drawings we have illustrated a simple two part pattern consisting of elements A and B mounted respectively on opposite faces of base 4. The base is shown in Fig. 2 secured in a position in which it projects pattern element A upwardly through stripping plate 7. The flask drag 11 is placed on plate 7 and filled with sand and, after ramming of the latter, the flask cover 11ª is applied and hooks 12 and lever 13 operated to clamp the complete drag to frame 3. Treadle 31 is then stepped on to withdraw plunger 29 from collar 27 and wheel 6 is operated to reverse the flask support frame to the position shown in Fig. 3 where it will be locked by engagement of plunger 29 with the other notch in collar 27. Pawl 19 is then withdrawn and lever 18 moved to its alternative position and there locked by entry of pawl 19 into the other notch in block 21. This movement of lever 18 shifts base 4 to the position shown in Fig. 3, adjacent plate 8 with pattern element B projecting through the latter.

Figure 3:
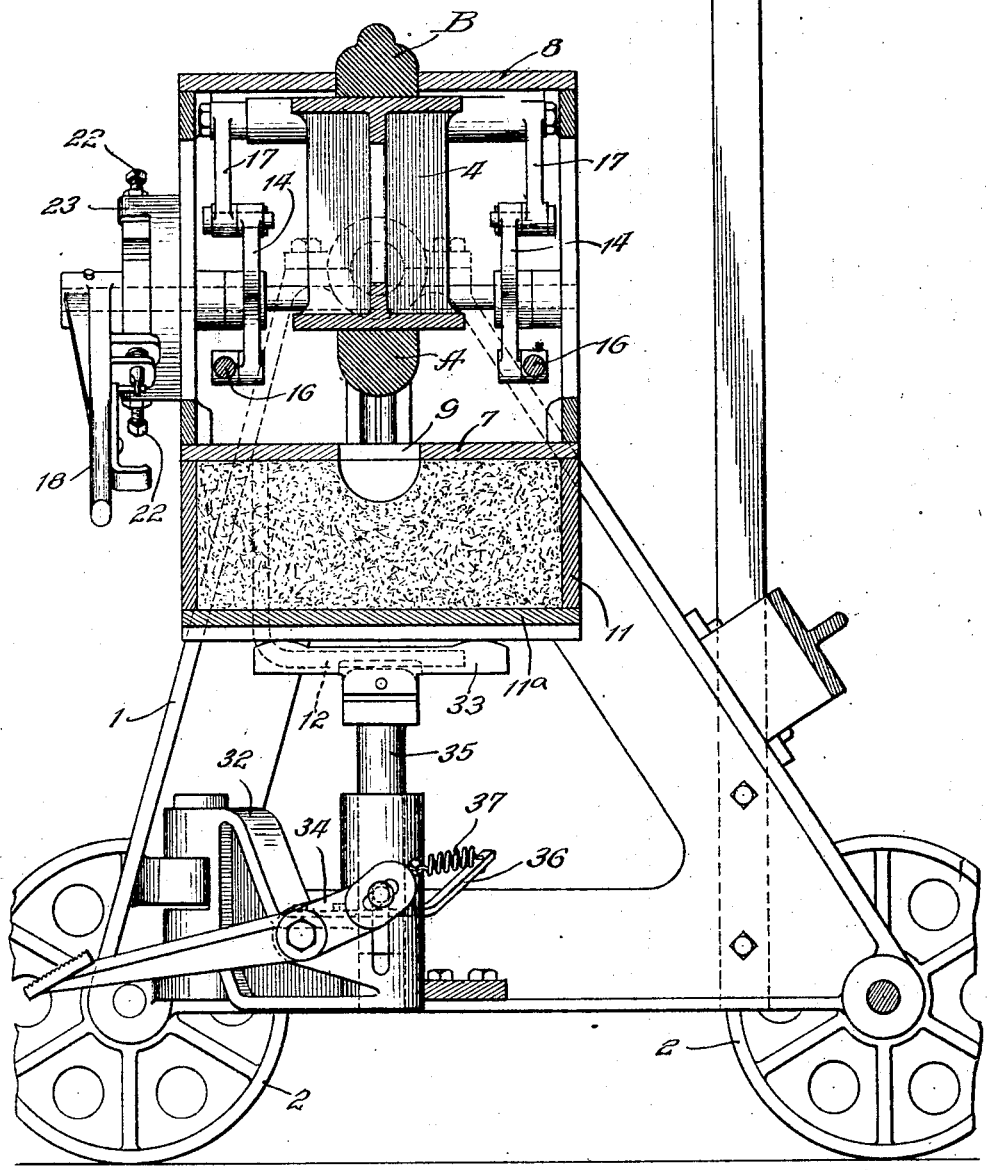
Fig. 3 is a similar section showing the same flask member in reverse position and after its cooperating pattern element has been separated from its mold.

The operator then presses on lever 34, raising pedestal 33 to the position shown in Fig. 3 and, releasing clamps 13, swings hooks 12 into disengaged position. Pressure is then removed from lever 34, the pedestal and drag lowered, and arm 32 swung outwardly of the machine and the drag removed.

The flask cope (not shown) is now applied to plate 8, the sand rammed around element B, the pattern stripped and the cope removed. We have illustrated no means for clamping the cope flask to the stripping plate 8, for in the ordinary use of the machine the cope will not be reversed. However, if it became desirable to turn the cope over, suitable clamps similar to those shown at 12 could be supplied for holding the flask.

It will be noted that equal projection of the pattern elements through their respective stripping plates is easily secured by adjustment of screws 22. By means of guides 25 and their adjusting screws 26, not only can loose play of pattern base 4 in frame 3 be eliminated, but the base and patterns mounted thereon may be shifted to align the pattern with its stripping plate.

In our machine, it is unnecessary to return the flask holding frame to its original position in order to prepare the second mold because, when the drag is reversed, the cope support plate is placed in molding position. When one pattern is stripped from its mold, the other is automatically inserted in molding position. The cope and drag pattern are molded alternately, hence there will always be equal numbers of copes and drags and no delay will be occasioned because of the necessity of waiting for cope molds for a series of completed drag molds. Also, any wear on the patterns will not result in offsets in the surface of the casting where the molds meet as might result if many molds were made consecutively from one pattern element and the molds from the corresponding pattern elements made subsequently. A single machine of our type may be used to produce both cope and drag molds without changing the pattern and stripping plates.

While these and other advantages resulting in the attainment of previously mentioned objects are secured by the machine illustrated and described, we are aware that changes in the form and construction of parts and details of construction may be made without departing from the invention or sacrificing the advantages thereof and we reserve the right to make all such changes and modifications as are fairly possible within the scope of the following claims.

We claim:

1. In a molding machine, a frame adapted to rotate in a vertical plane, stripping plates on said frame spaced transversely of their planes, a pattern base mounted on said frame between said plates, adapted to shift transversely thereof and to mount pattern elements on its faces adjacent said plates, means for shifting said base in said frame, and means for locking said base against shifting.

2. In a molding machine, a frame adapted to rotate in a vertical plane, stripping plates on said frame spaced transversely of their planes, a pattern base mounted on said frame between said plates, adapted to shift transversely thereof and to mount pattern elements on its faces adjacent said plates, means for rotating said frame, means for shifting said base, means for locking said frame and base in predetermined angular positions, and means for locking said base against shifting.

3. In a molding machine, a flask supporting frame including stripping plates positioned in parallel planes each having an opening through which a pattern element may project, a pattern supporting base, mechanism for shifting said base to and from said plates, and adjustable means for limiting the shifting of said base by said mechanism.

4. In a molding machine, a flask supporting frame including stripping plates positioned in parallel planes each having an opening through which a pattern element may project and which fits around such an element at its parting line, a pattern supporting base, mechanism for shifting said base to and from said plates and means for guiding said base when shifted, said means being adjustable transversely of the path of movement of said base.

5. In a molding machine, a flask supporting frame including stripping plates positioned in parallel planes each having an opening through which a pattern element may project, a pattern supporting base, mechanism for shifting said base including spaced bell cranks pivoted on said frame, links connecting one arm of each bell crank with said base, a connection between the other arm of each bell crank with the corresponding arm of another of said bell cranks, and means for rotating said bell cranks.

6. In a molding machine, a flask supporting frame including stripping plates positioned in parallel planes each having an opening through which a pattern element may project a pattern supporting base, mechanism for shifting said base including spaced shafts journaled in said frame, spaced levers mounted on each of said shafts, links between said levers and said base, and means for rotating said shaft.

7. In a molding machine, a flask supporting frame including stripping plates positioned in parallel planes each having an opening through which a pattern element may project, a pattern supporting base, mechanism for shifting said base including spaced shafts journaled in said frame, spaced bell cranks mounted on each of said shafts, a connection between one arm of each of said bell cranks and said base, a connection between the other arm of each of said bell cranks on one shaft and the corresponding arm of one of said bell cranks on the other of said shafts, and means for rotating one of said shafts.

8. In a molding machine, a box-like frame adapted to support flask members on its top and bottom, a pattern base contained in and of lesser depth than said frame, an opening in said base disposed transversely of said frame, a shaft extending through said opening and journaled in said frame, a lever mounted on said shaft and pivotally connected to said base, and means for operating said shaft to shift said base alternately toward the top and bottom of said frame.

9. In a molding machine, a flask supporting frame including stripping plates positioned in parallel planes each having an opening through which a pattern element may project, a pattern supporting base, mechanism for shifting said base to and from said plates, including an operating shaft journaled in said frame, a sectoral locking block pivoted on said shaft adjacent the side of said frame and provided with notches located around the axis of said shaft, lugs on the side of said frame adjacent said block, screws in said lugs adapted to engage opposite edges of said block, an arm on said block, an arm on said shaft, and a pawl on said arm adapted to be selectively engaged with one of said notches.

10. In a molding machine, a carriage, a box-like frame, opposite faces on said frame comprising stripping plates each adapted to support a flask member on its outer side, trunnions on other opposite faces of said frame fixed with respect to said stripping plates and journaled on said carriage, means mounted on the outside of said frame and adapted to clamp flask members to said plates, and means for rotating said frame on said trunnions.

11. In a molding machine, a carriage, a box-like frame, opposite faces on said frame comprising stripping plates each adapted to support a flask member on its outer side, trunnions on other opposite faces of said frame fixed with respect to said stripping plates and journaled on said carriage, means mounted on the outside of said frame and adapted to clamp flask members to said plates, a pattern support in said frame mounted to move to and from each of said plates, means on the outside of another face of said frame for so moving said support, and means for rotating said frame and support, with attached flask members, on said trunnions.

12. In a molding machine, a carriage, a flask supporting frame mounted on said carriage to rotate in a vertical plane, an arm hinged on said carriage to swing in a horizontal plane below said frame, a pedestal mounted to slide vertically on said arm, means for rotating said frame on said carriage and means for moving said pedestal on said arm.

13. In a molding machine, a frame adapted to support a flask member while a mold is being formed therein, means for reversing said frame and a flask member supported thereby, a pedestal for removing a flask member from said frame and an element adapted to yieldingly resist movement of said pedestal either towards said frame or away from same.

14. In a molding machine, a carriage, means for supporting a flask member while a mold is being formed therein, mechanism for reversing said means and a flask supported thereby, a pedestal movable up to and away from said means, a lever fulcrumed on said carriage and having one end operatively engaging said pedestal, a spring secured at one end to said lever and at the other end to said carriage at a point more remote from the extremities of the movement of said lever than from intermediate points in the movement of said lever.

15. In a molding machine, a rotatable flask supporting frame including stripping plates spaced apart at fixed distances from the axis of rotation, each plate having an opening through which a pattern may project and a pattern base mounted in the frame to move transversely to said stripping plates in opposite directions to retract a pattern from one stripping plate and project a pattern through the other stripping plate.

HARRY L. STEEB.
EZRA H. SOHNER.